United States Patent [19]
Umeda et al.

[11] Patent Number: 5,168,403
[45] Date of Patent: Dec. 1, 1992

[54] ZOOM LENS SYSTEM

[75] Inventors: Hiromu Umeda, Sakai; Akira Fukushima; Takashi Okada, both of Osaka; Junji Hashimura; Hisayuki Masumoto, both of Sakai, all of Japan

[73] Assignee: Minolta Camera Co., Ltd., Osaka, Japan

[21] Appl. No.: 623,298

[22] Filed: Dec. 6, 1990

[30] Foreign Application Priority Data

Dec. 7, 1989 [JP] Japan .................. 1-318234

[51] Int. Cl.⁵ .............. G02B 15/14; G02B 13/18; G02B 27/64
[52] U.S. Cl. .................. 359/692; 359/557; 359/714
[58] Field of Search ............. 350/422, 423, 426, 427, 350/500; 359/554, 557, 691, 692, 714

[56] References Cited

U.S. PATENT DOCUMENTS

| 4,974,951 | 12/1990 | Sander et al. | 350/500 |
| 5,000,549 | 3/1991 | Yamazaki | 350/500 X |

FOREIGN PATENT DOCUMENTS

| 56-21133 | 5/1981 | Japan . |
| 56-40804 | 9/1981 | Japan . |
| 62-203119 | 9/1987 | Japan . |
| 63-115126 | 5/1988 | Japan . |
| 63-118708 | 5/1988 | Japan . |
| 63-133119 | 6/1988 | Japan . |
| 63-201624 | 8/1988 | Japan . |
| 63-229425 | 9/1988 | Japan . |
| 1-116619 | 5/1989 | Japan . |
| 1-134420 | 5/1989 | Japan . |
| 1-189621 | 7/1989 | Japan . |
| 1-191112 | 8/1989 | Japan . |
| 1-191113 | 8/1989 | Japan . |
| 1-191825 | 8/1989 | Japan . |
| 1-284823 | 11/1989 | Japan . |
| 1-284824 | 11/1989 | Japan . |
| 1-284825 | 11/1989 | Japan . |

Primary Examiner—Scott J. Sugarman
Attorney, Agent, or Firm—Price, Gess & Ubell

[57] ABSTRACT

A zoom lens system comprises from the object side, a front lens group having a refractive power of a predetermined sign and a rear lens group having a refractive power of different sign from that of the front lens group. The front lens group is shiftable along the optical axis of the lens system in a zooming operation, and movable perpendicularly to the optical axis for decreasing a blur caused by a hand shake. The rear lens group is shiftable along the optical axis in the zooming operation.

8 Claims, 2 Drawing Sheets

ZOOM LENS SYSTEM

BACKGROUND OF THE INVENTION

1. Field of the Invention

The present invention relates to a zoom lens system, particularly to such system having a function to stabilize a blurred image when a camera is handheld during low shutter speeds and used in low light levels.

2. Description of the Related Art

In conventional photography, the quality of photographs was often deteriorated mainly because of out of focus and camera-shake.

Recently, an auto-focus mechanism has been employed in a camera. In addition, the auto-focus mechanism performs to a high degree of accuracy. Therefore, the problem caused by out of focus has been almost solved.

On the other hand, the problem caused by camera-shake has not been solved. One reason is that the magnification or the telephoto ratio of a lens system is becoming higher and higher, resulting that an influence of camera-shake on an image becomes great. In addition, a camera, such as a lens shutter camera, equipped with a zoom lens system has taken the place of a camera equipped with a fixed focal length lens system. Furthermore, a zoom lens system having a higher zooming ratio, or a longer focal length range is required recently, in general. Blurred image caused by camera-shake is more serious in such zoom lens system since the caused blur is enlarged.

Relating to camera-shake, various deflecting lens systems to stabilize a blurred image by moving a particular lens portion of the image forming lens system in a perpendicular direction relative to an optical axis have been suggested in Japanese laid open Pats. Nos. 63-115126, 63-118708, 63-133119, 63-229425, 63-201622, 63-201623, 63-169614, 50-137555, 63-201624 and 1-116619, and U.S. Pat. No. 4,907,868.

In addition, a mechanism for moving the deflecting lens portion, which comprises, for example, an acceleration sensor and an actuator, is shown in Japanese laid open Pat. No. 62-47011.

However, these related arts disclose mainly deflecting lens systems to stabilize a blurred image in a fixed focal length lens system.

In using a deflecting lens group stabilizing the blurred image in the zoom lens system, aberrations (asymmetry of field curvature and paraxial comatic aberration) based on decentering of the deflecting lens group must be decreased all over the zooming range. However, even if the deflecting lens system described in the related art is employed in the zoom lens system, it is very difficult to effectively reduce the aberration all over the zooming range. Especially, it is difficult to effectively reduce the aberration, in the center of photographing region, based on decentering of the deflecting lens group.

On the other hand, if a deflecting lens group to stabilize the blurred image is employed in a zoom lens system, it is desirable to correct aberrations caused in the deflecting lens group by the deflecting lens group itself. This means that the number of the lens elements composing the deflecting lens group will be increased, resulting that the entire size of the zoom lens system and a mechanism moving the deflecting lens group will be enlarged.

SUMMARY OF THE INVENTION

An object of the present invention is to provide a zoom lens system which comprises a small number of lens elements with little aberration over the zooming range irrespective of employment of a deflecting lens group for stabilizing a blurred image.

The features of the present invention which are believed to be novel are set forth with particularity in the appended claims. The present invention, together with further objects and advantages thereof, may best be understood by reference to the following description taken in conjunction with the accompanying drawings.

DETAILED DESCRIPTION OF PREFERRED EMBODIMENTS

Figure 1:
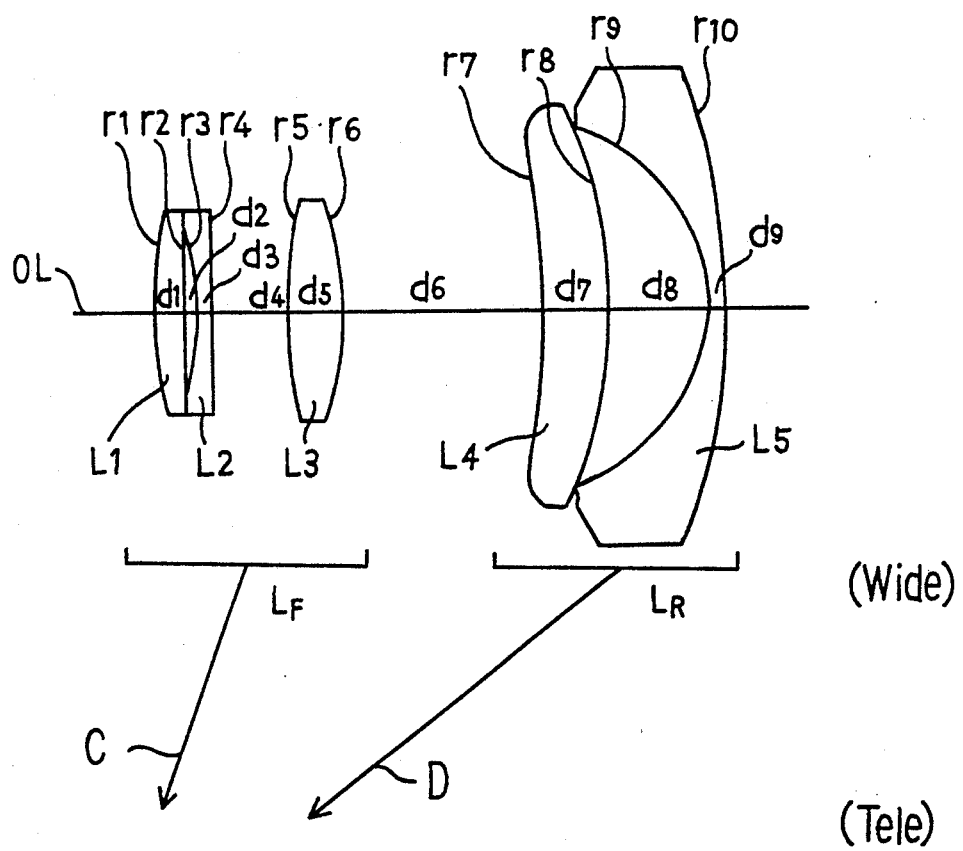
FIG. 1 shows a cross sectional view of a lens system according to an embodiment of the present invention.

FIG. 1 shows an arrangement of one embodiment constructed according to the invention. A zoom lens system shown in FIG. 1 comprises, from an object-side to an image-side, the front lens group $L_F$ having a positive refractive power and the rear lens group $L_R$ having a negative refractive power.

The front lens group $L_F$ comprises, from an object-side to an image-side, the first lens element $L_1$ consisting of positive meniscus lens convex to the object side, the second lens element $L_2$ consisting of negative meniscus lens concave to the object side and the third lens element $L_3$ consisting of positive binconvex lens. The rear lens group $L_R$ comprises, from an object-side to an image-side, the fourth lens element $L_4$ consisting of positive meniscus lens concave to the object side and the fifth lens element $L_5$ consisting of negative meniscus lens concave to the object side.

An object-side surface $r_1$ of the first lens element $L_1$, an image-side surface $r_6$ of the third lens element $L_3$, an object-side surface $r_7$ of the fourth lens element $L_4$ and an object-side surface $r_9$ of the fifth lens element $L_5$ are aspherical surface.

The front lens group $L_F$ or the rear lens group $L_R$ is designed as a deflecting lens group to stabilize a blurred image caused by a hand-shake. The deflecting lens group moves perpendicularly to the optical axis of the zoom lens system (hereinafter, referred to as "parallel decentering").

In one implementation of a zoom lens system according to the present invention, the front lens group $L_F$ acts the parallel decentering. In this case, the aberrations caused by "parallel decentering" of the front lens group $L_F$ is corrected by employing at least one aspheric surface applied to the front lens group $L_F$ itself.

In addition, it is desirable that the zoom lens system fulfills the following condition:

$$1.6 < |\phi_a/(F_{NT}/\phi_T) \times 10^5| < 20 \qquad (1)$$

wherein, $\phi_a$ represents refractive power of the front lens group $L_F$, $\phi_T$ represents refractive power of the whole lens system in the longest focal length conditions, and $F_{NT}$ represents F-number of the whole lens system in the longest focal length condition.

The condition (1) limits refractive power of the front lens group $L_F$. Aberrations caused in the front lens group is restricted by limiting the refractive power $\phi_a$ of the front lens group $L_F$. Under a constant focal length, a magnification of the rear lens group $L_R$ is determined by $\phi_a$. The image formed by the front lens group $L_F$ is relayed by the rear lens group $L_R$. Consequently, the magnification of the rear lens group $L_R$ limits a shifting amount of the image.

The upper limit of the condition (1) is violated when (i) $\phi_a$ increases or (ii) $F_{NT}/\phi_T$ decreases. In case of (i), a shifting amount of the image tends to increase relative to the decentering amount of the front lens group $L_F$ (the deflecting lens group). In case of (ii), a blurring amount of the image tends to decrease. Accordingly, in spite of the small blurring amount of the image, the shifting amount of the image relative to the decentering amount of the front lens group increases. It is consequently necessary for the decentering amount to be greater precision.

The lower limit of the condition (1) is violated when (iii) $\phi_a$ decreases or (iv) $F_{NT}/\phi_T$ increases. In case of (iii), a shifting amount of the image tends to decrease relative to the decentering amount of the front lens group. In case of (iv), a blurring amount of the image tends to increase. Accordingly, in spite of the large blurring amount of the image, the shifting amount of the image relative to the decentering amount of the front lens group decreases. It is consequently necessary for the decentering amount to be greater, and for a mechanism for "parallel decentering" to be larger.

In another implementation of a zoom lens system according to the present invention, the rear lens group $L_R$ acts the parallel decentering. In this case, the aberrations caused by "parallel decentering" of the rear lens group $L_R$ is corrected by aspheric surface applied to the rear lens group $L_R$ itself.

$$1.6 < |\phi_b/(F_{NT}/\phi_T) \times 10^5| < 20 \qquad (2)$$

wherein, $\phi_b$ represents refractive power of the rear lens group $L_R$, $\phi_T$ represents refractive power of the whole lens system in the longest focal length conditions, and $F_{NT}$ represents F-number of the whole lens system in the longest focal length condition.

In addition, it is desirable the condition (2) limits a shifting amount of the image relative to a shifting amount of the deflecting lens group (rear lens group $L_R$). The shifting amount of the image is influenced by the magnification of the deflecting lens group, and can be limited by the refractive power $\phi_b$ in the condition (2). The magnification $\beta_2$ of the rear lens group $L_R$ represents the following condition:

$$\beta_2 = \frac{\phi_T - \phi_b}{(1 - e\phi_b)\phi_T}$$

wherein e represents distance between the principal point of the front lens group $L_F$ and that of the rear lens group $L_R$. Accordingly, $\beta_2$ is determined by limiting $\phi_b$. Thus, the aberrations can be corrected in the rear lens group itself by limiting $\phi_b$ as described above. In addition, the shifting amount of the image can be controlled in relation to the decentering amount of the rear lens group thereby.

The upper limit of the condition (2) is violated when (i) $\phi_b$ increases or (ii) $F_{NT}/\phi_T$ decreases. In case of (i), a shifting amount of the image tends to increase relative to the decentering amount of the rear lens group (the deflecting lens group). In case of (ii), a blurring amount of the image tends to decrease. Accordingly, in spite of the small blurring amount of the image, the shifting amount of the image relative to the decentering amount of the rear lens group increases. It is consequently necessary for the decentering amount to be greater precision.

The lower limit of the condition (2) is violated when (iii) $\phi_b$ decreases or (iv) $F_{NT}/\phi_T$ increases. In case of (iii), a shifting amount of the image tends to decrease relative to the decentering amount of the rear lens group. In case of (iv), a blurring amount of the image tends to increase. Accordingly, in spite of the large blurring amount of the image, the shifting amount of the image relative to the decentering amount of the rear lens group decreases. It is consequently necessary for the decentering amount to be greater, and for a mechanism for "parallel decentering" to be enlarged.

The present embodiment has the following relations (I), (II) and (III).

(I) If $\phi_a$ is larger under a predetermined focal length, $\phi_b$ is larger, too. Consequently, a magnification of the rear lens group $L_R$ is larger, resulting that the shifting amount of the image relative to the decentering amount of the deflecting lens group is larger.

(II) If $F_{NT}$ is larger, shutter speed tends to be slower at even minimum F-number. Consequently, the blurring amount of the image tends to increase.

(III) If $\phi_T$ is smaller (i.e. longest focal length of the whole lens system is larger), the blurring amount of the image intends to increase.

In the above relations (I)~(III), if the relation of large and small is to the contrary, the tendency is to the contrary, too.

The front lens group $L_F$ and the rear lens group $L_R$ of FIG. 1 are designed to move along with the optical axis OL from the longest focal length condition Tele to the shortest focal length condition Wide as indicated by respective arrows C and D.

Figure 2:
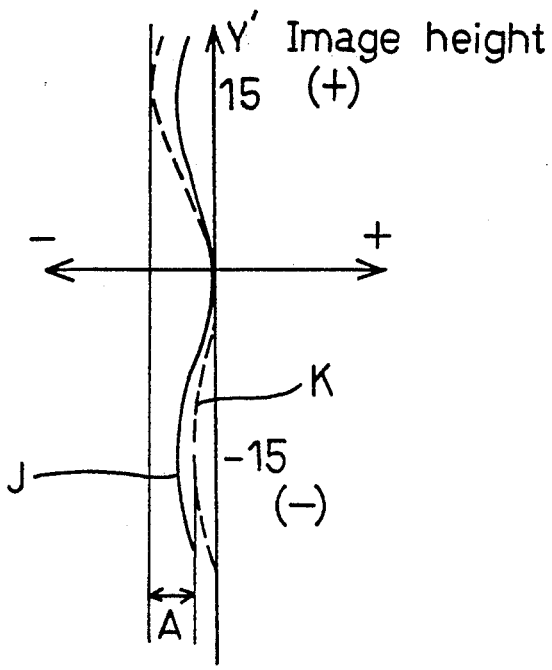
FIG. 2 is a graphic representation of the field curvature of the embodiment.

Next, the description will be given on an asymmetry of field curvature and an axial comatic aberration generated when "parallel decentering" of the front lens group or the rear lens group in FIG. 1 is performed. If the "parallel decentering" is not performed, field curvature is symmetric between the image heights (+) and (−). This means that an asymmetry of field curvature is not generated. In FIG. 2, a curved solid line J represents a designed value (that is, in a case of an asymmetry equal to zero).

The asymmetry of field curvature is represented by difference A between the values at the image heights $Y' = \pm 15$ on the dotted line K by which an image plane is represented when the "parallel decentering" of the front lens group or the rear lens group is performed.

The signs thereon are defined as follows. If the image plane at the image height (+) side exists at minus side, that is, left side in FIG. 2, relative to the designed value (the solid curved line J in FIG. 2), the sign is set to be negative. On the contrary, if the image plane at the image height (+) side exists at plus side relative to the designed valued, the sign is set to be positive.

Generally, if the "parallel decentering" of the front lens group $L_F$ or the rear lens group $L_R$ is not performed, an axial comatic aberration is zero. However, the "parallel decentering" of the front lens group $L_F$ or the rear lens group $L_R$ is performed, the axial comatic aberration occurs as shown in FIG. 3.

Figure 3:
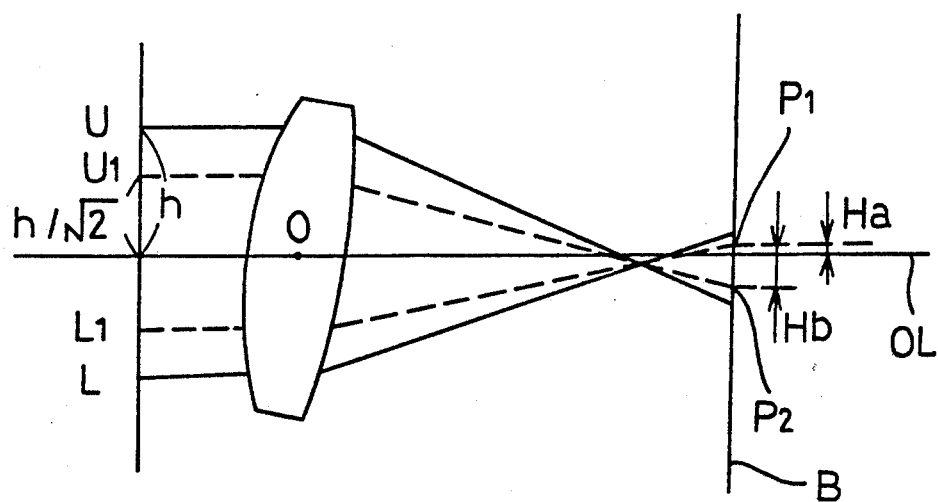
FIG. 3 shows a performance of a deflecting lens group for stabilizing a blurred image, relating to a paraxial comatic aberration in the embodiment.

As shown in FIG. 3, upper and lower points having the height of incident ray h(h=±15) are referred respectively as U and L, and upper and lower points having the height $h/2^{-\frac{1}{2}}$ are defined respectively as $U_1$ and $L_1$. Each light passing through the points $U_1$ and $L_1$ reach the points $P_1$ and $P_2$ on an image plane B. The distances from the points $P_1$ and $P_2$ to an optical axis OL are referred to as $H_a$ and $H_b$. The axial comatic aberration can be represented by $(H_a+H_b)/2$.

Table 1 shows a shifting amount of the image and the "parallel decentering" amount to obtain the shifting amount of the image at the shortest focal length condition (W), the medium focal length condition (M) and the longest focal length condition (T) respectively when the "parallel decentering" of the front lens group is performed. Table 2 shows the asymmetry of field curvature or a tangential image plane T and a sagittal image plane S and the axial comatic aberrations.

Table 3 shows a shifting amount of the image and "parallel decentering" amount and Table 4 shows the asymmetry of field curvature and the axial comatic aberration when the "parallel decentering" of the rear lens group is performed in the case.

The asymmetry of field curvature and the axial comatic aberration in Table 2 and Table 4 mean a deterioration of image at the height of image 6 mm because this example is constructed to be applied to a lens shutter camera.

Data will be described with respect to the embodiment. In Table 5, f represents a focal length of the lens system, $F_{NO}$ represents an f-number, $r_1$, $r_2$, $r_3$, . . . are radii of curvature with respective sub-number indicating the surfaces counted from the object-side to the image-side along the optical axis, $d_1$, $d_2$, $d_3$, . . . represent the axial distances and include both air spaces and actual thickness of lens elements along the optical axis, $N_1$, $N_2$, $N_3$, . . . represent the refractive indices of respective lens elements and again, the sub-number refers to the particular optical element counted from the object-side to the image-side, and $\nu_1$, $\nu_2$, $\nu_3$, . . . represent Abbe numbers of respective lens elements substantially counted from the object-side.

Aspherical surfaces in respective embodiments are defined by the following equation when the shape of the aspherical surface is represented by X(y):

$$X(y)=(r/a)[1-\{1-\epsilon(y^2/r^2)\}^{\frac{1}{2}}]+\Sigma A_i y^i$$

(summation Σ made for i≧2)
wherein the reference symbols are defined as follows:
X: a deviation of the aspherical surface from the basic spherical surface measured along the optical axis,
y: a distance measured along the optical axis,
r: radius of curvature of the basic spherical surface,
ε: conic coefficient, and
Ai: aspherical surface coefficients of i-th order.

In addition, when Ai=0, the aspherical surface used in the present embodiments depends on only ε. However, as known, ε can be developed and replaced with Ai, and therefore the generality of the invention is not failed.

TABLE 1

| | The decentering amount of the deflecting lens group | The shifting amount of the image (height of image = 15 mm) |
|---|---|---|
| W | 0.22 | 0.4 |
| M | 0.225 | 0.5 |
| T | 0.19 | 0.6 |

TABLE 2

| | Asymmetry of field curvature | | Axial comatic aberration |
|---|---|---|---|
| | S image | M image | |
| W | 0.065 | 0.022 | −0.0004 |
| M | 0.110 | 0.019 | 0.00002 |
| T | 0.138 | 0.02 | 0.0003 |

TABLE 3

| | The decentering amount of the deflecting lens group | The shifting amount of the image (height of image = 15 mm) |
|---|---|---|
| W | 0.5 | 0.4 |
| M | 0.32 | 0.5 |
| T | 0.25 | 0.6 |

TABLE 4

| | Asymmetry of field curvature | | Axial comatic aberration |
|---|---|---|---|
| | S image | M image | |
| W | −0.161 | −0.0423 | 0.0016 |
| M | −0.162 | −0.039 | 0.0004 |
| T | −0.184 | −0.0329 | 0.0002 |

TABLE 5

| f = 39.3~58.5~86.6 | | $F_{NO}$ = 3.6~5.4~8.0 | |
|---|---|---|---|
| Radius of Curvature | Distance | Refractive Index | Abbe Number |
| $r_1$* 24.078 | | | |
| | $d_1$ 1.800 | $N_1$ 1.51680 | $\nu_1$ 64.20 |
| $r_2$ 276.227 | | | |
| | $d_2$ 0.870 | | |
| $r_3$ −18.044 | | | |
| | $d_3$ 1.000 | $N_2$ 1.77551 | $\nu_2$ 37.90 |
| $r_4$ −102.950 | | | |
| | $d_4$ 4.675 | | |
| $r_5$ 27.314 | | | |
| | $d_5$ 3.500 | $N_3$ 1.51680 | $\nu_3$ 64.20 |
| $r_6$* −16.223 | | | |
| | $d_6$ 12.202~5.306~2.040 | | |
| $r_7$* −35.276 | | | |
| | $d_7$ 4.000 | $N_4$ 1.75520 | $\nu_4$ 27.51 |
| $r_8$ −28.708 | | | |
| | $d_8$ 6.000 | | |
| $r_9$* −10.831 | | | |
| | $d_9$ 1.044 | $N_5$ 1.74950 | $\nu_5$ 50.00 |
| $r_{10}$ −41.196 | | | |
| Σd = 35.090~28.195~24.929 | | | |

Coefficient of aspherical surface
$r_1$: ε = 0.25000 × 10
$r_6$: ε = 0
  $A_4$ = 0.41708 × 10$^{-4}$
  $A_6$ = 0.72248 × 10$^{-7}$
  $A_8$ = −0.80125 × 10$^{-9}$
  $A_{10}$ = −0.12351 × 10$^{-10}$
  $A_{12}$ = 0.23096 × 10$^{-12}$
$r_7$: ε = 0.10000 × 10
  $A_4$ = 0.41282 × 10$^{-4}$
  $A_6$ = 0.17308 × 10$^{-6}$
  $A_8$ = −0.29099 × 10$^{-9}$
  $A_{10}$ = −0.42090 × 10$^{-10}$
  $A_{12}$ = 0.39220 × 10$^{-12}$
$r_9$: ε = 0.10000 × 10
  $A_4$ = 0.31957 × 10$^{-5}$
  $A_6$ = 0.10038 × 10$^{-6}$ TABLE 5-continued $A_8 = -0.45587 \times 10^{-8}$
$A_{10} = -0.78343 \times 10^{-10}$
$A_{12} = 0.12848 \times 10^{-12}$ Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A zoom lens system comprising from the object side:
    a front lens group, including an aspheric surface, having a refractive power of a predetermined sign, and shiftable along an optical axis of the lens system in a zooming operation, the whole of said front lens group being movable perpendicularly to the optical axis for decreasing a blur caused by movement; and
    a rear lens group, including an aspheric surface, having a refractive power of a different sign from that of the front lens group, and shiftable along the optical axis of the lens system in a zooming operation.

2. A zoom lens system as claimed in claim 1, wherein said front lens group has a positive refractive power and said rear lens group has a negative refractive power.

3. A zoom lens system as claimed in claim 2, wherein the lens system fulfills the following condition;

$$1.6 < |\phi_a/(F_{NT}/\phi_T) \times 10^5| < 20$$

wherein,
    $\phi_a$ represents refractive power of the front lens group,
    $\phi_T$ represents refractive power of the whole lens system in the longest focal length condition, and
    $F_{NT}$ represents F-number of the whole lens system in the longest focal length condition.

4. A zoom lens system as claimed in claim 1, wherein the lens system fulfills the following condition;

$$1.6 < |\phi_a/(F_{NT}/\phi_T) \times 10^5| < 20$$

wherein,
    $\phi_a$ represents refractive power of the front lens group,
    $\phi_T$ represents refractive power of the whole lens system in the longest focal length condition, and
    $F_{NT}$ represents F-number of the whole lens system in the longest focal length condition.

5. A zoom lens system comprising from the object side:
    a front lens group having a refractive power of a predetermined sign, and shiftable along the optical axis of the lens system in a zooming operation; and
    a rear lens group, including an aspheric surface, having a refractive power of a different sign from that of the front lens group, and shiftable along the optical axis of the lens system in a zooming operation, the whole of said rear lens group being movable perpendicularly to the optical axis for decreasing a blur caused by movement.

6. A zoom lens system as claimed in claim 5, wherein said front lens group has a positive refractive power and said rear lens group has a negative refractive power.

7. A zoom lens system as claimed in claim 6, wherein the lens system fulfills the following condition;

$$1.6 < |\phi_b/(F_{NT}/\phi_T) \times 10^5| < 20$$

wherein,
    $\phi_b$ represents refractive power of the rear lens group,
    $\phi_T$ represents refractive power of the whole lens system in the longest focal length condition, and
    $F_{NT}$ represents F-number of the whole lens system in the longest focal length condition.

8. A zoom lens system as claimed in claim 5, wherein the lens system fulfills the following condition;

$$1.6 < |\phi_b/(F_{NT}/\phi_T) \times 10^5| < 20$$

wherein,
    $\phi_b$ represents refractive power of the rear lens group,
    $\phi_T$ represents refractive power of the whole lens system in the longest focal length condition, and
    $F_{NT}$ represents F-number of the whole lens system in the longest focal length condition.

* * * * *